United States Patent
Briskey et al.

(10) Patent No.: US 7,254,745 B2
(45) Date of Patent: Aug. 7, 2007

(54) DIAGNOSTIC PROBE MANAGEMENT IN DATA PROCESSING SYSTEMS

(75) Inventors: Kenneth C. Briskey, Hyde Park, NY (US); Bruce M. Potter, Saugerties, NY (US); Kesavaprasath Ranganathan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 10/263,886

(22) Filed: Oct. 3, 2002

(65) Prior Publication Data

US 2004/0068677 A1 Apr. 8, 2004

(51) Int. Cl.
*G06F 11/00* (2006.01)
(52) U.S. Cl. ....................................................... 714/27
(58) Field of Classification Search ................... 714/27
See application file for complete search history.

(56) References Cited

U.S. PATENT DOCUMENTS

| | | | |
|---|---|---|---|
| 5,319,775 A | 6/1994 | Loges et al. | 395/575 |
| 5,564,108 A | 10/1996 | Hunsaker et al. | 395/800 |
| 5,748,878 A | 5/1998 | Rees et al. | 395/183.14 |
| 5,815,651 A | 9/1998 | Litt | 395/182.08 |
| 5,864,662 A * | 1/1999 | Brownmiller et al. | 714/43 |
| 6,041,287 A | 3/2000 | Dister et al. | 702/182 |
| 6,085,243 A | 7/2000 | Fletcher et al. | 709/224 |
| 6,145,099 A | 11/2000 | Shindou | 714/37 |
| 6,151,688 A | 11/2000 | Wipfel et al. | 714/48 |
| 6,189,117 B1 | 2/2001 | Batchelor et al. | 714/48 |
| 6,338,112 B1 | 1/2002 | Wipfel et al. | 710/269 |
| 6,353,898 B1 | 3/2002 | Wipfel et al. | 714/48 |
| 6,357,017 B1 * | 3/2002 | Bereiter et al. | 714/27 |
| 6,983,317 B1 * | 1/2006 | Bishop et al. | 709/223 |
| 2005/0278273 A1 * | 12/2005 | Uthe | 707/1 |

FOREIGN PATENT DOCUMENTS

| EP | 0 709 779 A2 | 10/1995 |
|---|---|---|
| EP | WO 01/16750 A2 | 8/2000 |

OTHER PUBLICATIONS

U.S. Appl. No. 09/677,457 Creating a Consolidated Trace of Selected Work Units Executed by Multiple Work Managers of a Computing Environment (Application and Drawings attached).
V. Sethaput, A Framework for Automated Unit Testing of Live Network Clouds, 2001, pp. 579-592, 0-7803-6719-7/01.
W.C. Brantley, IBM Technical Disclosure Bulletin: Organizational Redundancy for a Parallel Processor Machine, vol. 28, No. 1, Jun. 1985, pp. 417-418, YO884-0214.

* cited by examiner

*Primary Examiner*—Bryce P. Bonzo
(74) *Attorney, Agent, or Firm*—Geraldine D. Monteleone, Esq.; Lawrence D. Cutter, Esq.; Heslin Rothenberg Farley & Mesiti P.C.

(57) ABSTRACT

A common interface (API) is provided which permits a single diagnostic probe manager to communicate with and to control a plurality of diagnostic probes. Through this interface the diagnostic probes are enabled to pass information concerning dependencies between software levels present in a hierarchical stack. This information is particularly useful in that it permits the probe manager to direct diagnostic efforts at the lowest desirable level so as to avoid the problems that occur when problems are indicated at a high level but which are actually caused by lower level software components.

18 Claims, 1 Drawing Sheet

DIAGNOSTIC PROBE MANAGEMENT IN DATA PROCESSING SYSTEMS

BACKGROUND OF THE INVENTION

The present invention is generally directed to diagnosing software problems in data processing systems. More particularly, the present invention is particularly directed to a system and method for consistent and extendable management of diagnostic probes. Even more particularly the present invention is directed to a system of independently constructable diagnostic probes. And even more particularly, the present invention is directed to the construction and utilization of diagnostic software probes which are capable of diagnosing problems within a plurality of system software levels. Moreover, the present invention is particularly useful in clustered data processing systems which generally possess more complex software in a distributed hierarchical arrangement.

In the context of the present invention, a diagnostic probe is a relatively small, stand-alone program that provides direct diagnostic functionality for a specific software or hardware component in a data processing system. Each probe is capable of codifying a specific part of an expert's debugging knowledge.

In cluster systems management software, many components and daemons run on many machines (nodes) and these components are designed so that normally they are communicating properly and using correct data in order for the cluster to run properly. However, it is difficult to guarantee that all of these various components can automatically recover from communication and data integrity problems. Thus, there may be times when some portion of the cluster stops functioning properly. Making the problem worse, it is usually very difficult for the customer to diagnose the root cause of these problems because of the complexity of the components and the various interactions which are designed into the system to insure that the components work together efficiently, consistently and harmoniously. This complexity is enhanced by the fact that software is often configured in a hierarchy of levels and dependencies. A problem at a low level may manifest itself at a higher level but diagnosis at the higher level may not provide any clues as to the nature of the dysfunction.

The diagnostic probe manager system of the present invention assists customers in diagnosing software problems in the cluster. The invention includes a probe manager and a plurality of probes. Each probe preferably checks only one system component to verify that it is functioning properly and that it has appropriate data. In addition, each probe returns an indication of the other probes it is dependent on. This indication usually identifies the probes of other, possibly related components that should be working properly in order for this probe's component to work. The probe manager queries all the probes that are registered for their specific dependencies. The probes use this information to build a dependency graph so that it can run the probes in order from the lowest software layer to the highest layer. This increases the chances of finding the root cause of the problem, instead of merely finding downstream effects. When a probe finds a problem, it displays the problem (and usually a corrective action) to the user, and the default action of the probe manager is to stop. It is noted that the operation of the diagnostic probes herein does not necessarily have to take place because of or be driven by the occurrence of a problem or fault. The probe manager is capable of initiating probe activity on its own, based on a number of criteria including scheduled maintenance intervals. Furthermore, the probe manager is aware of the fact that certain portions of the data processing system and its related software are more important than others. Accordingly, probes are supplied that examine many of the critical aspects of the operating system as well as many components of cluster systems management software, particularly those that are known to have greater significance in maintaining system operations.

The real value of this diagnostic probe manager subsystem is that the software vendor (in this case International Business Machines, Inc., the assignee of the present invention) is better able to codify its expertise in diagnosing the software, thus contributing to an accumulation of knowledge relevant to how all the components fit together, what things typically go wrong, and the order in which things should be examined. It is like having the smartest developer of the software come to your site and sit down and start looking at the pieces of the software in the most logical order, checking for all the things the software developer has seen go wrong until the problem is found.

Most currently available software diagnostic tools are either structured as a single program or they include a set of hard-coded tools that try to diagnose system problems. These diagnostic tools typically diagnose the operating system of only a single personal computer or workstation. In a data processing system which includes a plurality of independent nodes operating and intercommunicating in a clustered environment, the situation is much more complex. Not only can things go wrong at the operating system level, but the whole cluster software stack can have problems, and multiple machines are involved. As used herein the phrase "software stack" refers to a collection of programs which run below the level of application programs and which exist in a hierarchical arrangement of operational and data dependencies. To tackle diagnosing a system as complex as this, a flexible, extensible, easy to develop solution provides the most highly desired solution.

The architecture of the probe system allows each probe to be developed individually, by separate people. In the typical situation, an expert on a particular component develops the probe for that component. Several utilities are provided for implementing probes so that the probe developer can concentrate on just the things that can go wrong with that component. Because dependent probes are executed first, the scope of what can go wrong with a component is limited to things specific to that component. In contrast, a monolithic diagnostic program responsible for checking the whole software stack quickly becomes so complicated that component experts usually can't develop it. Instead, it usually requires developers that are dedicated to working on the diagnostic tool. However, the probe architecture of the present invention allows development of probes in a decentralized fashion.

Another issue with diagnostic tools is coverage. A diagnostic tool is most useful if it catches a high percentage of users' problems. In the present invention the dependency processing feature and separation of probes allows additional probes to be added over time; in this manner, the coverage is increased and newly added software components are provided with diagnostic coverage. Additionally, newly discovered problems are easily be added to the diagnostic probes.

Another important feature of the architecture of the present probe subsystem is that it can be extended by customers. The probe utilities and the Application Program Interface (API) between the probe manager and the probes permits customers to add their own probes. This allows customers to diagnose applications that they run on top of the clustering software and also allows them to check for errors that they have encountered that supplied probes don't yet catch.

SUMMARY OF THE INVENTION

In accordance with a preferred embodiment of the present invention a method is provided for diagnosing software problems in data processing systems comprising the step of providing a common interface for communicating with a plurality of diagnostic probes. A diagnostic probe manager is employed which provides a common interface for launching (if necessary) and for communicating with a plurality of independent diagnostic probes which are capable of returning information regarding dependency. The probes are preferably focused on a single software component whose dependency level is either known or communicated.

Accordingly, it is an object of the present invention to provide diagnoses of software problems, particularly in clustered data processing systems.

It is also an object of the present invention to increase the reliability of data processing systems, particularly clustered data processing systems.

It is a still further object of the present invention to provide diagnostic probes which are directed to specific software components.

Additionally, it is an object of the present invention to provide a common and consistent interface which permits independently created diagnostic probes to interact with a diagnostic probe manager.

It is yet another object of the present invention to permit the creation of diagnostic probes which are directed at specific levels of software dependencies.

It is another object of the present invention to provide diagnostic probes which are able to communicate dependency information.

It is a still further object of the present invention to provide a manager for a plurality of diagnostic probes.

It is also an object of the present invention to provide an interface and environment for the creation of independently written diagnostic probes.

It is yet another object of the present invention to develop more advanced diagnostic probes.

It is an additional object of the present invention to better match diagnostic probes with specifically targeted software components.

It is a still further object of the present invention to increase the coverage provided by diagnostic software.

It is a still further object of the present invention to provide a mechanism for the consistent development and usage of diagnostic probes for newly discovered problems.

It is yet another object of the present invention to provide an environment and an interface which permits individual customers to create their own diagnostic probes.

It is also an object of the present invention to provide a mechanism in which software problems can be diagnosed at a more appropriate level which takes dependencies into account.

It is a still further object of the present invention to provide a mechanism for the decentralized creation of diagnostic probes.

It is an additional object of the present invention to provide a diagnostic probe system which is capable of supplying more germane messages to data processing system users and administrators.

It is yet another object of the present invention to provide diagnostic probes which are directed to the analysis of problems associated with a single software component so as to provide more focused analysis, diagnostics and messages.

Lastly, but not limited hereto, it is an object of the present invention to provide an architecture and interface for the management, construction, deployment and operation of a plurality of independently operating diagnostic probes.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Diagnostic Probe Architecture Overview

Figure 1:
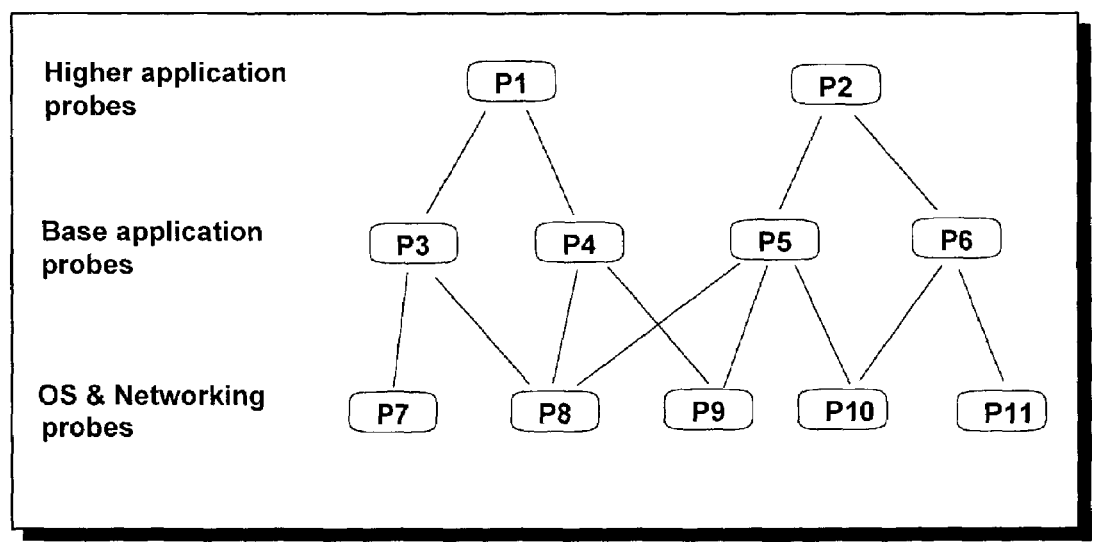
FIG. 1 is a diagram illustrating diagnostic probe dependencies which exist in a tree structure.

The diagnostic probe architecture of the present invention provides system administrators with the ability to identify the root cause of system problems. The diagnostic probe architecture includes a probe manager and a set of diagnostic probes and also very preferably includes a sufficiently well defined interface that provides support for creating additional probes.

The probe manager is responsible for building a dependency tree of probes and for running the probes based on their position in the tree, from the bottom of the tree to the top of the tree and is also responsible for returning probe results to the system administrator.

The diagnostic probes of the present invention are relatively small, stand-alone programs that provide the actual diagnostic functionality relevant to a specific part of a system. Each probe is responsible for checking the health of a subsystem or part of a subsystem. Probes are usually invoked by the probe manager, not by the end user. Upon invocation, each probe is responsible for determining the "health" of a particular part of the system and reporting its findings back to the probe manager. Since components usually depend on other components, a probe for a component is provided with the ability to express dependency on probes for dependent components.

The architecture of the diagnostic probe system herein also provides templates and utilities which can be used by component or subsystem developers and system administrators for easily creating new probes.

EXTERNALS

Introduction

The diagnostic probe architecture includes a probe manager and a set of diagnostic probes and is very preferably designed to provide support for creating additional probes which may be customized and specialized to address any number of software subsystems. The external design details of the components associated with the diagnostic probe architecture are discussed in this section.

Probe Manager

The probe manager uses a dependency list, which is returned by each of the individual diagnostic probes, to build a dependency tree and then executes the probes starting from the leaves of the tree to the root of the tree and then returns the probe result to the system administrator. By executing the probes from the lowest level to the highest level, the root cause of a software/system problem is thereby more easily determined thus avoiding the occurrence of downstream effects. It is noted that in some cases the dependency list may contain a null entry indicating that, for that particular probe, directed to a particular subsystem, there are no immediate dependencies beyond the initial probe itself.

As an example, consider a set of Probes A, B, C and D. Suppose that the probes' dependencies are as follows:

A [Depends on] B

B [Depends on] C, D

The order in which these probes are run, with the above dependencies, is as follows:

Run C & D (Specific order not deterministic)

Run B

Run A

Typical Dependency Tree

FIG. 1 illustrates a typical set of diagnostic probe dependencies. For example, it is seen that higher level application probes P1 and P2 are dependent upon probes P3 and P4 (for probe P1) and on probes P5 and P6 (for probe P2). Likewise, probe P3 is dependent on probe P7 and probe P8, and so on, as shown. In operation, probes P7, P8, P9, P10 and P11 would be run first and would return their results to probes P3, P4, P5 and P6 in the manner set forth in FIG. 1. In this regard it is noted that the probes do not call each other directly; rather, individual probes provide an indication of their dependency other probes. The Probe Manager takes care of running the probes in the correct order and also takes care of ensuring that the same probe does not get run more than once. Also there are no messages that get passed between the probes; each probe performs its task independently of the other probes.

In normal operation, any error detected by a probe causes the probe manager to stop executing the probes that depend on the failed probe, thus isolating the problem in a component to the realm of items checked by the failed probe. The probe manager is provided with an option which allows execution of probes that depend on a failed probe. This option is specified by the system administrator when invoking the probe manager command. A probe-to-probe-manager interface is defined and the interaction between the probe and the probe manager is through this interface.

Probe Manager Invocation

The probe manager command (ProbeManager) provides options to indicate what severity of error messages should be returned, whether it should continue when an error is found, what probes should be run or excluded, etc. These options are also specifiable in a more persistent fashion via environment variables.

Probes

Probes are small stand-alone programs that provide the actual diagnostic functionality for a specific aspect of a component. Every significant piece of software or system is normally composed of a number of parts that do a specific task and interact with each other to provide a significant function. The parts are referred to components. Each diagnostic probe performs a specific diagnostic task and specifies a list of probes upon which it is dependent. As an example, a probe checking the health of a network daemon (server) will check some specific characteristic of the daemon and could express a dependency on a probe that checks the health of the network. Each component is preferably associated with its own set of probes, with each probe being capable of diagnosing a particular aspect of the component and expressing dependencies on other probes. These other probes either belong to the subject component's probe set or belong to probes associated with other components outside of the first set of probes.

Probe Invocation

In accordance with a preferred implementation of the present invention each diagnostic probe support employs a command line invocation such as the preferred one shown below:

probe-name [-d|-s|-h|-m|[-e msgnum . . . ][-l{1|2|3|4}]]

Diagnostic probe options are shown between the square brackets above. In particular, they have the following meanings:

-h means "show usage information."

-d means "return the probe dependency list. The probe can specify a required set of dependencies and an optional set of dependencies as well.

-s means "return a one line summary of the purpose of the probe."

-m means "return a detailed documentation for the probe."

-e msgnum1,msgnum2, . . .

Indicates that the messages identified by the passed message numbers are to be ignored. They are therefor not output. The probe itself determines whether ignoring the message should affect the exit status or not.

-l{1|2|3|4}

Indicates the level of message output that is to be reported by the probe. The message level determines the urgency of the message. The following message levels are available in preferred embodiments of the present invention:

1—Show probe trace messages, probe explanation and suggested action messages, probe attention messages and probe error messages. This is the equivalent of a verbose option.

2—Show probe explanation and suggested action messages, probe attention (warning or information) messages and probe error messages.

3—Show probe attention messages and probe error messages only.

4—Show probe error messages only.

Probe Output

Output from probes is provided in the form of dependency lists, messages, purpose summary or detailed documentation. An optional status code can also be provided upon return.

Dependency List

If the probe is given the -d option, the probe simply outputs its list of dependencies to stdout (the standard output file or device as defined to the operating system by or for the system administrator). The list is a colon-separated list of probe names.

Messages

Each message contains the following information:

---

Probe name
Message level
Message number (Not needed for Trace messages) and
Message text
    The message text format is "Probe-name:message-level: message
        number: message text."
    -- Probe-name is the name of the probe
-- Message level is one of Trace, Attention, Error or
    InternalError indicating the message type.
        Trace - trace message used mostly for debugging.
        Attention - Warning or Informational message.
        Error - Failure message.
        InternalError - The probe could not perform the
            check because of an internal problem with
            the probe.
-- Message number (which is unique) identifying the message.
    The message number is not needed for Trace messages.
-- Message text is the text that describes the message being output.

---

Purpose Summary

If the probe is given the -s option, the probe outputs a one line summary about the purpose of the probe.

If the probe is given the -h option, the probe outputs usage information, which typically includes information on using the command, including the meaning and structure for all of the valid arguments that are passed to the command.

Detailed Documentation

If the probe is started with the -m option set, the probe outputs detailed documentation for the probe including such items as exactly how a probe goes about its task of identifying problems.

Status Codes

When a probe exits, it returns one of five exit status codes to indicate its level of success:

0—Success—The probe found nothing wrong with the subsystem that it was checking.

1—Invalid—The software component that the probe is checking is not installed or the probe is not valid for the current hardware/software environment. This is not an error and will be ignored by the probe manager.

10—Attention—The probe found some things that must be brought to the attention of the system administrators; but no errors were detected.

20—Error—The probe found an error in the subsystem that it was checking.

127—Internal Error—The probe could not complete its check because an unexpected error occurred while the diagnostics were run.

Writing Probes

In order to achieve the greatest level of success for the present probe manager architecture, an abundance of probes should be available to most fully address the needs of end users but which of practical needs ought to be provided by component and subsystem developers who are most familiar with their own software. The system administrator should also be able to add new probes easily to identify problems for which probes do not currently exist. Thus the process of diagnostic probe creation should be easy and flexible. Accordingly, the following are important aspects to consider with regard to the task of probe development: (1) Probes are stand-alone programs that communicate with the probe manager using a well-defined interface; (2) The probe manager invokes the probes with certain command line flags and options; (3) The user may have set certain environment variables which the probe should check; (4) The probe communicates back to the probe manager by printing messages to stdout and appropriately setting its exit status; (5) Probes should be intelligent and along with the probe manager simulate the way an expert administrator systematically checks various parts of the system to find the root cause of a problem; (6) Each probe codifies a specific part of this debugging knowledge; (7) Probes scope is small (If the scope of the probes diagnostics are limited, the administrator can be brought very close to the root cause of a failure.); (8) A probe only lists direct dependencies in its dependency list; (9) Probes are preferably conventional executables such as shell scripts, Perl scripts, and statically linked compiled executables.

The naming of probes is also providable in a consistent manner. For example, a probe name preferably comprises three components (say company name, product name and probe) specified in the following format (the choice of delimiter being somewhat arbitrary):

CompanyName.Product.probename

An example of a probename in this format is as follows:

IBM.DMSRM.checkCSMDBUserIdExist

If the probe is given the -d option, the probe simply outputs its list of dependencies to stdout. This list is a colon-separated list of probe names. Note though that any delimiter, not just a colon may be employed. The probe preferably specifies a set of required dependencies and a list of optional dependencies. If the dependencies in the optional list are not available, then the probe manager assumes that those probes were run successfully. The required dependency list and the optional dependency list are separated by the '#' character (again, any convenient delimiting character may be employed). For example, such a list may preferably take the following form:

Product1.probeA:product1.probeB:
    product2.probeF#product2.probeG

For probes developed internally (that is, by the original manufacturer of the data processing system) the probes, probe utilities (if any; see below), probe configuration (if any; also, see below) and the message files are preferably installed under the standard top-level probe directory (named "/opt/diagnostics" in the pSeries of data processing systems manufactured and sold by International Business Machines Corp., the assignee of the present invention).

For probes developed by the user, the suggestion is to place the probes, utilities and the configuration in a directory that is different from the standard directory and using the following mechanisms to identify them to the probe manager and to the probes. The directory containing the user developed probes is specified by using the -d flag when invoking the probe manager. The directory containing user developed probe utilities is specified by using the USER_PROBE_UTILDIR environment variable. The user can also change the standard utilities directory by setting the STD_PROBE_UTILDIR environment variable, but in this case all the standard utilities would have to be copied to this new directory. The directory which contains configurations information for user developed probes is specified by using the USER_PROBE_CONFIGDIR environment variable. To change the configuration files for standard probes (those shipped as part of the diagnostic probes package), the user must copy all the standard configurations to another directory and modify the configuration files for specific probes to reflect the component configuration and then set the STD_PROBE_CONFIGDIR environment variable to point to this directory. It should be remembered that when changing the standard configuration directory, the configuration information for all the probes should be copied to the new directory.

Support for Writing Probes

A perl script based probe template is provided as part of the probe package in order to make it easy to develop probes in per. The probe template is preferably placed in the directory labeled "/opt/diagnostics/templates." The template shows how to use the probe_support utility to handle tasks that are common to all probes, including the following tasks:

parsing command-line arguments;

printing messages in the correct format;

filtering out messages based on command-line arguments; and returning correct status codes.

The user developed probes may be placed in any directory and can express dependencies on the probes in the standard probes directory (/opt/diagnostics/probes).

Probe Utilities

In order to complete its diagnostic work, a probe may need support scripts or some other executable(s). A set of standard utilities is shipped as part of the probe package and is, by default, located in the "/opt/diagnostics/utilities" directory. If desired, the user can change this by setting the STD_PROBE_UTILDIR environment variable.

A probe's authors may provide, along with the probe, a collection of utilities which are installed on the system. The utilities are preferably provided in a directory that is common to all probes and contains utilities that are useful to a plurality of probes. The location of this directory is preferably "/opt/diagnostics/utilitites" and can be changed by setting the environment variable STD_PROBE_UTILDIR.

Utilities developed by the users are preferably placed in a directory that is different from the standard utilities directory and this information is passed to user developed probes by setting the USER_PROBE_UTILDIR environment variable.

The following table provides a list of utilities which are may be typically provided by a system manufacturer. These are general utilities which are typically desirable for use in conjunction with certain probes and are further provided to ease development. All these utilities are preferably provided as perl scripts. All of the following utilities, unless otherwise noted, return exit status 0 on success, 1 on failure, and 127 when an unexpected error occurs.

TABLE I

Probe Utilities

| Utility Name | Synopsis | Description |
|---|---|---|
| fileperms | fileperms filename permission | Checks whether the permissions on a specific file match the specified permission. The permission argument is an octal number representing the file permission. |
| freespace | freespace directory | Determines the file system on which directory is located and then prints the free space on that filesystem. An absolute path name is to be provided for directory, not a relative one. |
| gid2group | gid2group gid | Prints the group name associated with gid. An error occurs if gid is not found in /etc/group. |
| group2gid | group2gid groupname | Prints the gid associated with groupname. An error occurs if groupname is not found in /etc/group. |
| groupexist | groupexist [gid|groupname] | Checks whether the group specified by either gid or groupname exists in /etc/group. A success exit status indicates the group was found. |
| portavail | portavail [t|u] portnumber|portname | Checks whether the specified port is available. The utility examines TCP ports when -t is specified and UDP ports when -u is specified. The port parameter can be a port number or a service name listed in /etc/services. If service names is used and cannot be located, the script returns exit status 127. |
| uid2user | uid2user uid | Prints the user name associated with uid. An error occurs if uid is not found in /etc/passwd. |
| user2uid | user2uid username | Prints the uid associated with username. An error occurs if username is not found in /etc/passwd. |
| userexist | userexist [uid] [username] | Checks whether the user specified by either uid or username exists in /etc/passwd. A success exit status indicates the user was found. |
| whatgroup | whatgroup filename | Prints the group who owns filename. |
| whoowns | whoowns filename | Prints the user who owns filename. |
| osinfo | osinfo | Prints the operating system information. The output format is Operating System name: Distributor: Version |
| csmnodetype | csmnodetype | Determines the type of CSM node. The output is one of ManagementServer, ManagedNode or Unknown |

Probe Configuration

A probe may require access to some configuration parameters (for example, location of a subsystem's configuration). For example, if an application depends on another application that runs on another remote machine and the application gets the hostname of the remote machine from a file located in a specific directory, this file can be called as the configuration file for the application. Consequently, there is provided a predefined directory where all probes may find a configuration file. The location of this directory is specified via the STD_PROBE_CONFIGDIR environment variable. The name of the file is determined by the probe. The probe, however, does not write to this file. The information in the file represents system-specific options that a probe uses while examining the system. A probe's operation should not depend on the configuration file. If the probe cannot find the configuration file, the probe falls back upon reasonable defaults and outputs an attention message with the default values that are used by the probe. If reasonable defaults cannot be determined, then the probe terminates with a return code of 127 indicating that an internal error occurred.

The STD_PROBE_CONFIGDIR environment variable determines the directory where probe configurations are stored. The directory name should not be relative (that is, it should begin with a '/'). If the variable is unset, the configuration directory is "/opt/diagnostics/config."

For user developed probes the USER_PROBE_CONFIGDIR environment variable is used to specify the directory where the configuration files for those probes reside.

A set of diagnostic probes providing basic diagnostic functionality is preferably provided by system manufacturers when a system is shipped or when its software is upgraded. A typical set of these basic diagnostic probes are set forth in Table II below:

TABLE II

Available Base Probes

| Probe Name | Dependencies | Description |
| --- | --- | --- |
| fs.mounts | None | Checks to make sure that all filesystems specified in /etc/fstab as automount (i.e.. the noauto flag is not given) are actually mounted. Also ensures that the files are indeed read-only if that is specified or read-write if nothing is specified. |
| network | network.enabled, network.hostname, network.ifaces, network.ip_defrag, network.ip_forward, network.ping, network.routes | This is a dummy probe that expresses dependencies on all other network probes. This probe with all of its dependencies verifies proper operation of network devices and verifies IP settings. It checks route configuration and also attempts to ping the local machine. |
| network.enabled | None | This probe checks to see if NETWORKING = yes in /etc/sysconfig/network. It returns an error if it is "no" or if /etc/sysconfig/network does not exist. |
| network.hostname | None | This probe checks to see if the hostname in /etc/sysconfig/network is consistent with the hostname of the system. |
| network.ifaces | network.enabled | This probe checks that the interfaces specified in /etc/sysconfig/network-scripts/ifcfg -* have the specified parameters (IP address, netmask, and broadcast address). It also ensures the interfaces are up and running. For dynamically configured interfaces this probe only ensures the device exists and the interface is up. |
| network.ip_defrag | None | This probe checks to see if the enabled status IP auto defragmentation is consistent with /etc/sysconfig/network. This probe relies on the /proc filesystem. It also relies on the ability to configure IPv4 parameters at runtime. |
| network.ip_forward | None | This probe checks to see if the enabled status IP forwarding is consistent with /etc/sysconfig/network. This probe relies on the /proc filesystem. It also relies on the ability to configure IPv4 parameters at runtime. |
| network.ping | network.enabled, network.ifaces, network.routes | This probe tries to ping each interface of the local machine ensuring that it is properly responding. It sends 10 ICMP echo packets to each interface and counts the number of replies. No replies implies there is an error. If less than 10 replies are received, a warning is displayed. There is a timeout period of 10 seconds, which should be sufficient. |
| network.routes | network.enabled, network.ifaces, | This probe ensures that the routes that should be created for each interface and the default routes are in the kernel route table. This probe does not check for the routes specified in /etc/sysconfig/static-routes. It prints a warning for any interface that does not specify its IP address in its configuration file, which produces an attention message for every interface that is dynamically configured. Attention: This probe incorrectly gives error messages if host/network names are used in the configuration files rather than addresses in dotted quad notation. |

Note: In the table above the term "dotted quad configuration" refers to an IP (Internet Protocol) Address represented as in the format ww.xx.yy.zz (such as, 161.53.4.28).

Repairing Software

In addition to diagnosing problems in software components, probes can also sometimes suggest fixes for the problem found. Since each probe is a "domain expert" with respect to the component it is analyzing, it is reasonable to expect that in some cases the probe "knows" exactly what caused the problem and how to resolve it. To enable this, an additional message level (see Probe Output section) is defined called "Fix". For this message level, the message text is actually a command string that can be run to address the problem found. This command is normally run by the probe manager or a higher level application (for example, a probe GUI) after displaying the problem message to the user and asking the user whether or not the fix should be executed. For cases in which the solution is less exact, another message level called "Suggestion" is defined. This is output by the probe to give the user instructions on how to solve the problem.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for constructing diagnosis software for use in data processing systems, said method comprising the step of:
providing a diagnostic probe manager and a plurality of diagnostic probes which have a common interface defined for communication between said diagnostic probe manager and said diagnostic probes, said probes being directed to a specific hierarchical software level and being further capable of returning information to the diagnostic probe manager indicating dependency on other diagnostic probes controlled by said manager.

2. The method of claim 1 in which at least some of said plurality of diagnostic probes are independent.

3. The method of claim 1 in which said diagnostic probe manager determines in what order said other diagnostic probes are executed based upon said returned dependency information.

4. The method of claim 1 in which said diagnostic probe manager operates to prevent probes from being run twice.

5. The method of claim 1 in which said diagnostic probe manager causes a lowest level of diagnostic probe to be executed first.

6. The method of claim 1 in which said diagnostic probe manager determines in what order said other diagnostic probes are executed.

7. The method of claim 1 in which said diagnostic probe manager operates to prevent probes from being run twice.

8. A method for diagnosing software problems in data processing systems, said method comprising the steps of:
providing a plurality of diagnostic probes; and
providing a diagnostic probe manager for said plurality of diagnostic probes1 said probes and said diagnostic probe manager communicating through a common interface, said diagnostic probes being directed to a specific hierarchical software level and being further capable of returning information to said diagnostic probe manager indicating dependency on other diagnostic probes controlled by said manager.

9. The method of claim 8 in which at least some of said plurality of diagnostic probes are independent.

10. The method of claim 8 in which said diagnostic probe manager is capable of allowing execution of probes that depend on a failed probe.

11. The method of claim 8 in which at least one diagnostic probe returns information selected from the set consisting of error messages, probe dependency, probe purpose and detailed probe documentation.

12. The method of claim 8 in which said interface includes a flag for indicating that errors indicated by specified messages numbers are to be ignored.

13. The method of claim 8 in which said interface includes a flag indicating a severity level for determining whether or not error messages are reported.

14. The method of claim 8 in which at least one of said probes returns a status indication.

15. The method of claim 8 in which each diagnostic probe operates independently of all other diagnostic probes.

16. The method of claim 8 in which said diagnostic probe manager ceases execution of any probe depending on a failed probe.

17. A data processing system including memory and processor elements wherein said memory includes a plurality of software components and further includes a plurality of diagnostic probes for determining problems with said software components and a diagnostic probe manager for said plurality of diagnostic probes, said diagnostic probes and said diagnostic probe manager having a common interface defined for communication between said diagnostic probe manager and said diagnostic probes, said probes being directed to a specific hierarchical software level and being further capable of returning information to the diagnostic probe manager indicating dependency on other diagnostic probes controlled by said manager.

18. A machine readable medium containing thereon code for implementing a diagnostic probe manager which provides a common interface for communicating between said diagnostic probe manager and a plurality of diagnostic probes, said diagnostic probes and said diagnostic probe manager having a common interface defined for communication between said diagnostic probe manager and said diagnostic probes, said probes being directed to a specific hierarchical software level and being further capable of returning information to the diagnostic probe manager indicating dependency on other diagnostic probes controlled by said manager.

* * * * *